US006482372B2

(12) United States Patent
Robakowski, Jr. et al.

(10) Patent No.: US 6,482,372 B2
(45) Date of Patent: Nov. 19, 2002

(54) PROCESS FOR RECOVERING PALLADIUM FROM A SOLUTION

(75) Inventors: Edward Robakowski, Jr., Brecksville; Lyle E. Kirman, Cleveland Heights, both of OH (US)

(73) Assignee: Kinetico Incorporated, Newbury, OH (US)

( * ) Notice: Subject to any disclaimer, the term of this patent is extended or adjusted under 35 U.S.C. 154(b) by 0 days.

(21) Appl. No.: 09/747,459

(22) Filed: Dec. 22, 2000

(65) Prior Publication Data

US 2002/0119085 A1 Aug. 29, 2002

(51) Int. Cl.[7] .......................... C22B 11/00; C22B 25/00
(52) U.S. Cl. ............................ 423/22; 423/92; 210/688
(58) Field of Search ........................ 423/22, 92, 93; 75/720; 205/565; 210/688

(56) References Cited

U.S. PATENT DOCUMENTS 3,656,939 A * 4/1972 Boehm et al.
5,332,420 A    7/1994 Cupertino et al.

FOREIGN PATENT DOCUMENTS

| EP | 0224209 B1 |   | 3/1993  |
|----|------------|---|---------|
| JP | 1-111825   | * | 4/1989  |
| JP | 3-158425   | * | 7/1991  |
| JP | 3-277730   | * | 12/1991 |

OTHER PUBLICATIONS

Anis et al, "The Basics on Rack Plating of Plastics," 4 pages, Journal of the American Electroplaters and Surface Finishers Society (1994), no month.

Mandich, "EMI Shielding by Electroless Plating of ABS Plastics," pp. 60–63, Plating and Surface Finishing (1994), no month.

Snyder, "Direct Metallization System for Decorative Plating on Plastics," pp. 807–812, The National Metal Finishing Report (date unknown).

Waitz, Jr., "Recovery Of Precious Metals With Amerlite Ion Exchange Resins," 3 pages (1984), no month.

Calmon et al., "Ion Exchange for Pollution Control, vol. 1," CRC Press, Inc., 4 pages (1979), no month.

"Reillex™: A New Family of Corsslinked Polyvinylpyridnes," Report 5, Reilly, 2 pages, author unknown, date unknown.

3 pages from Diaion® Ion Exchange Resins Manual II, date unknown.

2 page information sheet from Rohm and Haas Company, Amberlite Ion Exchange Resins, IE–69–62. 76 78 (1981), no month.

31 page patent/application report (1997), no month.

* cited by examiner

Primary Examiner—Steven Bos
(74) Attorney, Agent, or Firm—Watts, Hoffmann, Fisher & Heinke, Co., LPA

(57) ABSTRACT

A method for selectively separating and recovering palladium from an aqueous palladium/tin catalyst solution. The method includes the steps of adjusting the pH of the aqueous solution to a specified pH range thereby precipitating the tin, and producing a soluble form a palladium. The solution can be either pre-filtered or settled and subsequently processed through ion exchange resin in a conventional manner, or processed in an upflow direction through an at least partially fluidized bed of ion exchange resin to remove and concentrate the palladium for recovery.

12 Claims, No Drawings

PROCESS FOR RECOVERING PALLADIUM FROM A SOLUTION

FIELD IF INVENTION

The present invention is directed to a process for the removal and recovery of palladium. More specifically, the process is directed to adjusting the pH of a solution comprising soluble palladium and tin, and contacting the solution with an ion exchange resin for the removal and subsequent recovery of palladium metal.

BACKGROUND OF THE INVENTION

Palladium is widely used as a catalyst to metallize or plate nonconductive, non-metallic materials such as plastics, glasses and ceramics. The products that use a palladium catalyst process to metallize substrates include, among others, printed circuit boards, plastic automotive trim, plastic plumbing fixtures, plastic enclosures to provide RF shielding for electronic devices and the like. The metallization or plating of these various products include similar process steps. The non-conductive, non-metallic surfaces of the substrate are first subjected to cleaning and etching steps to thoroughly clean and roughen up the surface. The substrate is then dipped into a catalyst solution. The catalyst solution is typically an aqueous solution that contains soluble palladium compounds and also usually contains a soluble form of tin. Palladium and tin metal are then selectively deposited onto the surface of the substrate. The palladium deposits serve as a catalyst for plating other metals onto the surface in subsequent processing steps. If an electroless process is utilized, the tin is typically removed from the surface leaving metallic palladium deposits to activate the electroless processing. Typical metals deposited onto the substrate include copper and nickel. The expense of palladium metal limits its use as a catalyst.

Typically, the step immediately following deposition of the palladium metal is a rinse. After rinsing the substrate, there may or may not be an accelerator step that is used to remove any tin that may have been deposited with the palladium metal. If used, as is common in some electroless plating processes, this step is also followed by a rinse of the substrate. Following deposition of the palladium metal onto the substrate, a thin layer of metal is deposited onto the catalyzed surface. As previously noted, this is typically done by an electroless plating process, i.e., plating by chemical reduction rather than by the application of direct electrical current. Alternatively, other plating methods may be employed, such as direct metallization. Direct metallization includes the use of palladium catalyst solution to form the first conductive and catalytic layer in the manner as described above.

Palladium is a very valuable metal and as such, it is desirable to recover the palladium that is present in the rinse or rinses that occur following immersion of the substrate into the palladium catalyst solution. It is also desirable to reclaim rather than to dispose of this metal to the environment in a solid or liquid form, since metals persist in the environment forever, and certain complexes of palladium are known to be carcinogenic.

The palladium catalyst solutions used for metallization contain soluble tin in addition to the palladium ions. Tin is used to stabilize palladium in solution and is normally present in amounts greater than about ten times the amount of soluble palladium. The presence of tin inhibits palladium from spontaneously precipitating out of the solution in metallic form. Thus, tin functions as a stabilizer to prolong the life of the catalyst solution and to maximize the availability of palladium ions for metallization. However, the presence of tin also complicates recovery of palladium from the rinse solutions. Tin is known to precipitate at the pH values commonly used in the rinses. These tin precipitates are difficult to filter and foul most apparatuses employed to recover the palladium. In addition, precipitation of the tin can destabilize the palladium remaining in the rinse solution and consequently, cause the palladium to form a precipitate along with the tin. As such, the amount of palladium available for recovery is diminished. Lowering the pH in the rinses may prevent tin precipitation, but the soluble tin would then interfere with and compete with the recovery of the far more valuable palladium.

Accordingly, there is a need for a process for removing and recovering palladium from solutions. It is desired that the process is relatively simple and highly selective for recovering substantially pure palladium from the solution.

SUMMARY OF THE INVENTION

The present invention is directed to a process for the removal and recovery of palladium from a solution. One process includes adjusting the pH of the aqueous solution to a level wherein at least about 90 percent of the palladium remains in solution and greater than 99 percent of the tin in the solution forms a precipitate; and contacting the aqueous solution with an ion exchange resin, wherein the ion exchange resin contains functional groups effective to impart an affinity for palladium ions. The process overcomes the problems associated with the prior art and provides a relatively simple process to selectively recover palladium.

One process for selectively removing palladium ions from a solution comprising palladium ions and tin ions includes the steps of:

a) adjusting the pH of the solution comprising palladium ions and tin ions to a pH range from about 2.0 to about 3.5;

b) removing precipitated tin from the solution; and c) contacting the solution with an ion exchange resin effective to selectively remove palladium ions from the solution.

Preferably, at least 99 percent of the tin ions in the solution are used to form the tin precipitate. Recovering palladium metal from the ion exchange resin includes heating the resin to a temperature effective to ash the resin or regenerating the resin with a chemical solution to obtain a solution of palladium ions and subsequently reducing the palladium ions to obtain the palladium metal. In the case of regenerating the resin, an additional reducing step includes electrolytically reducing the palladium ions to obtain the palladium metal or chemically reducing the palladium ions to obtain the palladium metal.

Optionally, the step of contacting the aqueous solution with ion exchange resin may include processing the solution in a downflow direction or in an upflow direction through an at least partially fluidized bed of the ion exchange resin wherein the precipitate flows through the fluidized bed and the ion exchange resin selectively removes the palladium ions from the solution.

The inventive process is especially suitable for processing rinse solutions used during a process for plating metal onto a non-conductive material. The rinse solutions are typically aqueous solutions containing soluble palladium and tin compounds. As previously discussed, it is highly desirable to isolate and recover the palladium used in plating operations and the like.

Other embodiments of the invention are contemplated to provide particular features and structural variants of the basic elements. The specific embodiments referred to as well as possible variations and the various features and advantages of the invention will become better understood when considered in connection with the detailed description that follows.

DETAILED DESCRIPTION OF PREFERRED EMBODIMENTS

The present invention is directed to a process for recovering palladium from an aqueous solution containing, among other, palladium and tin ions. Advantageously, the inventive process results in the recovery of palladium metal. The process includes the steps of adjusting the pH of the aqueous solution to a specified pH range thereby selectively precipitating the tin and producing a soluble form of palladium. Then, the solution can be either pre-filtered or settled and subsequently processed through an ion exchange resin in a conventional manner, or processed in an upflow direction through an at least partially fluidized bed of ion exchange resin to remove and concentrate the palladium for recovery. Processing the solution through an at least partially fluidized bed of ion exchange resin allows suspended solids to pass through the resin while still allowing removal of the soluble palladium.

In particular, an aqueous palladium/tin solution is chemically treated with an alkali metal hydroxide or hydrochloric acid to a pH range of about 2.0 to about 3.5 and allowed to equilibrate by mixing. Agitation is suspended and the resulting tin precipitate is allowed to settle. This can take place in a variety of different tank configurations or clarification devices as is well known to those skilled in the art. The resulting clarified palladium bearing solution is then transferred to a filter apparatus or an ion exchange vessel containing an ion exchange resin. Preferably, the ion exchange resin is strong base anion resin possessing a quaternary ammonium functional group in the chloride form. A commercially available ion exchange resin suitable for use in the present invention is sold under the trade name IRA 400 available from the Rohm and Haas Company. The solution is then passed through the ion exchange media in a conventional manner or through a partially fluidized bed to selectively remove and concentrate the palladium. The palladium removed from the solution is then recovered from the resin by conventional processes generally known to those skilled in the art. For instance, palladium can be removed by heating the resin to a temperature effective to cause the resin to ash. Once the resin is ashed, the palladium can be recovered by a leaching process. Alternatively, the palladium can be regenerated from the resin with a suitable chemical solution to obtain a solution of palladium containing ions, followed by chemical or electrolytic reduction of palladium to the metallic form so that it can be reclaimed.

The process utilized in the present invention is not intended to be limited to any specific ion exchange resin. Other ion exchange resins with different functional groups may be used and its suitability for use in the present invention will become apparent to those skilled in the art in view of this disclosure. In particular, strongly basic anionic ion exchange resins are preferred wherein the basic groups are quaternary ammonium or phosphonium groups attached to a polymeric backbone. Suitable polymeric backbones include high molecular weight polymers and copolymers, e.g., addition and condensation polymers including polyalkylene, polyester, polycarbonate, polyurethane, formaldehyde resins, etc. Commercially available ion exchange resins include resins based on polyacrylate or styrene-divinyl benzene copolymers. Preferably, the ion exchange resins contain functional groups that exhibit preferential affinity for palladium ions in the pH range specified in the preferred embodiment.

The following examples are detailed description of methods of preparation and use of the process in accordance with the present invention. The detailed examples fall within the scope of, and serve to exemplify, the more generally described methods set forth above. The examples are presented for illustrative purposes only, and are not intended to limit the scope of the invention.

Example 1

In this example, the effect of pH on the solubility of tin and palladium was determined.

An aqueous solution containing 1.79 mg/L $Pd^{2+}$ and 177 mg/L $Sn^{2+}$ and $Sn^{4+}$ ions at pH 1.0 was treated with 19N NaOH to achieve pH values of: 2.0, 2.5, 3.0, 3.5, and 4.0. The initial solution while slightly cloudy contained no visible precipitate. The background acid matrix was determined by standard procedures indicating a 0.63% acid value as HCl. Addition of 19N NaOH was performed with agitation. Solutions were allowed to equilibrate and settle for 1.5 hours at 25° C. after target pH was achieved. Samples were decanted and filtered through 0.45 micron filters to evaluate soluble species. The amount of soluble palladium and tin was measured by Flame Atomic Absorption Spectroscopy (FAAS). The results are shown in table 1.

The results show that palladium and tin were completely soluble at a pH of about 1.0. Increasing the pH from about 2.0 to about 3.5 results in over 99% of the tin precipitating out of solution, wherein over 90% of the palladium remains in solution. At a pH of 4.0, a marked decrease in palladium solubility was observed (about 74% remained in solution).

Example 2

Example 2 demonstrates the importance of first separating the tin from the palladium before the attempting recovery. Solutions containing known amounts of soluble tin and palladium were prepared at various pH values between 1 and 7. The solutions were then allowed to settle and the resulting supernatants were decanted to serve as initial challenges. 50 ml aliquots of each solution were allowed to equilibrate with 1 gram of IRA-400 ion exchange resin, a strong base type ion exchange resin commercially available from Rohm and Haas Company, with periodic agitation for 16 hours. Samples were then filtered to remove the resin and the isolated solutions were analyzed for palladium and tin by FAAS. The results are shown in table 2.

This example demonstrates that at low pH values, e.g., pH 1, both palladium and tin are highly soluble. Moreover, tin ions are removed by the ion exchange resin in significant quantities, thereby competing with palladium ions in the recovery process. The data further demonstrates that at pH values greater than or equal to 5, palladium is co-precipitated with tin and as a result, subsequent recovery of palladium is reduced.

Example 3

In this example, 2500 ml of a soluble tin/palladium solution was adjusted to a pH value of 2.57, allowed to settle and then filtered. The filtered solution, containing 2.15 mg/l of soluble palladium, was then processed downflow through a column containing 50 ml of IRA-400 ion exchange resin at a rate equivalent to 1 gallon per minute (gpm) per cubic foot of resin. The amount of palladium in 500 ml aliquot of the solution was measured after contact with the ion exchange resin. The results are shown in table 3.

The results clearly show that the ion exchange resin effectively removed palladium from the solution. Saturation of the ion exchange resin with palladium was not achieved based on the media and challenge solution volumes.

Example 4

In Example 4, a pretreated solution, containing 1.94 mg/l of soluble palladium, was processed downflow through a column containing 10 ml of IRA-400 ion exchange resin at a rate equivalent to 1 gallon per minute (gpm) per cubic foot of resin in accordance with the procedure used in Example 3. The initial solution prior to pretreatment contained 2.01 mg/(L "dissolved" palladium and 113 mg/L "dissolved" tin. After pH adjustment to pH 2.5, the solution forms a visible precipitate which settled rapidly. The sample was then decanted and the resulting supernatant filtered through a 0.45 micron membrane filter to obtain "dissolved" metal concentration in accordance with the standard practice outlined in the 19 the edition of the "Standard Methods for the Examination of Water and Wastewater". Analysis by FAAS indicated a palladium concentration of 1.94 mg/L and a tin concentration of <1.0 mg/L. The intent of Example 4 was to evaluate the loading capacity and leakage characteristics of the aforementioned ion exchange resin. The results are shown in tables 4A, B and C.

At this point, the resin had removed 1.8 mg of palladium per milliliter of resin. Additional solution was obtained and processed in the same manner using the same resin. The results are shown in Table 4B.

At this point, 4.8 mg of palladium per milliliter of resin had been removed, and 2,280 resin bed volumes had been processed. An additional 13 liters of solution was then processed as in the previous step in this example using the same resin. The results of this test are shown in Table 4C.

At this point, the ion exchange resin had processed 3,580 resin bed volumes of liquid, and while not totally exhausted to the point where the effluent palladium concentration was equal to the influent concentration, the resin exhibited significant leakage of palladium. Over 30% of the influent palladium passed through the resin at the conclusion of this test. More importantly, over 7.3 milligrams of palladium per milliliter of resin had been removed. The results of this study demonstrate that the capacity of the ion exchange resin makes recovery of palladium by the inventive process to be economically viable and attractive.

Many modifications and variations of the invention will be apparent to those skilled in the art in light of the foregoing disclosure. Therefore, it is to be understood that, within the scope of the appended claims, the invention can be practiced otherwise than has been specifically shown and described.

What is claimed is:

1. A process for selectively removing palladium ions from a solution comprising palladium ions and tin ions, the process comprising the steps of:

a) adjusting a pH of the solution comprising palladium ions and tin ions, wherein the adjusted pH is in a range from about 2.0 to about 3.5;

b) removing a tin precipitate from the solution; and c) contacting the solution with an ion exchange resin effective to selectively remove palladium ions from the solution.

2. The process according to claim 1 wherein at least 99 percent of the tin ions in the solution are used to form the tin precipitate.

3. The process according to claim 1 further comprising the step of recovering a palladium metal from the ion exchange resin by heating the resin to a temperature effective to ash the resin and isolating the palladium metal from the ash.

4. The process according to claim 3 wherein the step of recovering a palladium metal from the ion exchange resin comprises regenerating the resin with a chemical solution to obtain a solution containing the palladium ions and reducing the palladium ions to obtain the palladium metal.

5. The process according to claim 4 wherein the reducing step comprises electrolytically reducing the palladium ions to obtain the palladium metal.

6. The process according to claim 4 wherein the reducing step comprises chemically reducing the palladium ions to obtain the palladium metal.

7. The method according to claim 1 wherein the solution is a rinse solution used during a process for plating metal onto a non-conductive substrate.

8. A process for selectively removing palladium ions from a solution comprising palladium ions and tin ions, the process comprising the steps of:

a) adjusting a pH of the solution comprising palladium ions and tin ions, wherein the adjusted pH is in a range from about 2.0 to about 3.5;

b) agitating the solution;

c) resting the solution, wherein a tin precipitate settles to a bottom portion of the solution;

d) decanting the solution from the tin precipitate to obtain a clear solution comprising less than 1 mg/liter of soluble tin remaining in solution; and e) contacting the clear solution with an ion exchange resin effective to remove the palladium ions from the solution.

9. The process according to claim 8 wherein the step of contacting the solution with ion exchange resin comprises processing the solution in an upflow direction through an at least partially fluidized bed of the ion exchange resin wherein the tin precipitate flows through the fluidized bed and the ion exchange resin selectively removes the palladium ions from the solution.

10. The process according to claim 8 wherein the step of contacting the solution with ion exchange resin comprises processing the solution in a downflow direction through a bed of the ion exchange resin, wherein the ion exchange resin selectively removes the palladium ions from the solution.

11. The process according to claim 8 wherein at least 99 percent of the tin ions in the solution are used to form the tin precipitate.

12. The process according to claim 8 wherein at least about 90 percent of the palladium remains in solution after the step of adjusting the pH of the solution.

* * * * *

UNITED STATES PATENT AND TRADEMARK OFFICE
CERTIFICATE OF CORRECTION

PATENT NO. : 6,482,372 B2
DATED : November 19, 2002
INVENTOR(S) : Edward Robakowski, Jr. et al.

It is certified that error appears in the above-identified patent and that said Letters Patent is hereby corrected as shown below:

<u>Column 4,</u>
Line 37, the following Table 1 should be added:
--

Table 1

| pH | Soluble Palladium (mg/L) | Soluble Tin (mg/L) |
|---|---|---|
| 1.0 | 1.79 | 177 |
| 2.0 | 1.61 | <1 |
| 2.5 | 1.68 | <1 |
| 3.0 | 1.63 | <1 |
| 3.5 | 1.61 | <1 |
| 4.0 | 1.32 | <1 |

--

Line 61, the following Table 2 should be added:
--

Table 2

| pH | Initial Sn (mg/L) | Final Sn (mg/L) | Removed Sn (mg/L) | Initial Pd (mg/L) | Final Pd (mg/L) | Removed Pd (mg/L) |
|---|---|---|---|---|---|---|
| 1 | 317 | 275 | 42 | 2.02 | 0.42 | 1.6 |
| 3 | 4.4 | 1.5 | 2.9 | 1.88 | 0.48 | 1.4 |
| 5 | 1.7 | <0.8 | >0.9 | 1.25 | 0.50 | 0.75 |
| 7 | 1.9 | <0.8 | >1.1 | 0.15 | 0.13 | 0.02 |

--

<u>Column 5,</u>
Line 9, the following Table 3 should be added:
--

Table 3

| Sample | Palladium (mg/L) | Tin (mg/L) |
|---|---|---|
| Influent | 2.15 | <1 |
| First 500 ml | <0.1 | <1 |
| Second 500 ml | <0.1 | <1 |
| Third 500 ml | <0.1 | <1 |
| Fourth 500 ml | 0.12 | <1 |
| Fifth 500 ml | 0.15 | <1 |

--

After line 30, the following Table 4A should be added:
--

Table 4A

| Sample | Palladium (mg/L) | Tin (mg/L) |
|---|---|---|
| Influent | 1.94 | <1 |
| 1 liter | 0.04 | <1 |
| 2 liter | 0.05 | <1 |
| 3 liter | 0.13 | <1 |
| 4 liter | 0.09 | <1 |
| 5 liter | 0.09 | <1 |
| 6 liter | <0.1 | <1 |
| 7 liter | <0.1 | <1 |
| 8 liter | <0.1 | <1 |
| 9 liter | <0.1 | <1 |
| 9.8 liter | <0.1 | <1 |

--

UNITED STATES PATENT AND TRADEMARK OFFICE
CERTIFICATE OF CORRECTION

PATENT NO.   : 6,482,372 B2
DATED        : November 19, 2002
INVENTOR(S)  : Edward Robakowski, Jr. et al.

It is certified that error appears in the above-identified patent and that said Letters Patent is hereby corrected as shown below:

Column 5 cont'd,
After line 34, the following Table 4B should be added:
--

Table 4B

| Sample   | Palladium (mg/L) | Tin (mg/L) |
|----------|------------------|------------|
| Influent | 2.6              | <1         |
| 1 liter  | 0.3              | <1         |
| 2 liter  | 0.2              | <1         |
| 3 liter  | 0.3              | <1         |
| 4 liter  | 0.2              | <1         |
| 5 liter  | 0.3              | <1         |
| 6 liter  | 0.2              | <1         |
| 7 liter  | 0.2              | <1         |
| 8 liter  | 0.3              | <1         |
| 9 liter  | 0.3              | <1         |
| 10 liter | 0.3              | <1         |
| 11 liter | 0.3              | <1         |
| 12 liter | 0.2              | <1         |
| 13 liter | 0.3              | <1         |

--

Signed and Sealed this

First Day of April, 2003

JAMES E. ROGAN
*Director of the United States Patent and Trademark Office*